United States Patent [19]

Dilling

[11] Patent Number: 4,642,336

[45] Date of Patent: * Feb. 10, 1987

[54] AMMONIUM LIGNOSULFONATES

[75] Inventor: Peter Dilling, Isle of Palms, S.C.

[73] Assignee: Westvaco Corporation, New York, N.Y.

[*] Notice: The portion of the term of this patent subsequent to May 20, 2003 has been disclaimed.

[21] Appl. No.: 679,901

[22] Filed: Dec. 10, 1984

[51] Int. Cl.$^4$ ................................................. C07G 1/00
[52] U.S. Cl. ...................................... 530/500; 530/501; 527/400; 527/403
[58] Field of Search .................. 527/400, 403; 8/543, 8/547, 901; 530/501, 500; 106/123.1

[56] References Cited

U.S. PATENT DOCUMENTS

| | | | |
|---|---|---|---|
| 2,525,433 | 10/1950 | Voet | 106/30 |
| 2,680,113 | 6/1954 | Adler et al. | 106/123.1 |
| 2,690,973 | 10/1954 | Voet | 106/20 |
| 3,094,515 | 6/1963 | Keirstead et al. | 530/500 |
| 3,156,520 | 11/1964 | Blaisdell | 8/91 |
| 3,503,762 | 3/1970 | Remer | 106/23 |
| 3,726,850 | 4/1973 | Detroit | 530/500 |
| 3,769,272 | 10/1973 | Hintz | 530/504 |
| 3,841,887 | 10/1974 | Falkehag et al. | 106/123 LC |
| 4,001,202 | 1/1977 | Dilling et al. | 530/502 |
| 4,047,567 | 9/1977 | Childs et al. | 530/501 |
| 4,131,564 | 12/1978 | Dilling | 252/353 |
| 4,184,845 | 1/1980 | Lin | 8/34 |
| 4,308,203 | 12/1981 | Lin | 530/500 |
| 4,355,996 | 10/1982 | Dilling et al. | 8/561 |
| 4,465,495 | 8/1984 | Scheffee | 44/51 |
| 4,521,336 | 6/1985 | Dilling | 530/501 |
| 4,546,173 | 10/1985 | Dilling | 530/501 |
| 4,551,151 | 11/1985 | Dilling | 8/524 |

Primary Examiner—John Kight
Assistant Examiner—Nathan M. Nutter
Attorney, Agent, or Firm—Terry B. McDaniel; Richard L. Schmalz

[57] ABSTRACT

A method of producing ammonium salts of sulfomethylated lignins suited for use as dyestuff and coal-water slurry additives comprising of the steps of ionizing the phenol component of a lignin material by-product of the black liquor of a kraft paper-making process in an alkaline liquid medium, methylolating the lignin material, lowering the pH of the liquid medium to an acid pH to precipitate the methylolated lignin material, washing the precipitated lignin material with water to remove inorganic salts and residual reactants therefrom, and sulfonating the washed, purified methylolated lignin material with an ammonium salt of a sulphur-oxygen containing compound in a liquid medium.

The washed, purified methylolated lignin material is preferably sulfonated at an acid pH level to minimize the production of electrolytes when the lignin is to be used for dyeing at low pH. Lignin products produced by the method, as well as dye and coal-water slurry compositions containing such products are also disclosed.

8 Claims, No Drawings

AMMONIUM LIGNOSULFONATES

The present invention relates to a method of producing ammonium salts of lignosulfonates and to products so produced thereby, and, more particularly, to ammonium lignosulfonate salts particularly suited for use as a dispersant in dye compositions and aqueous coal slurries.

BACKGROUND OF THE INVENTION

It is known to employ lignosulfonate compounds, including sodium salts of lignosulfonates, as an additive, such as a dispersant, in textile dyestuffs and printing pigments. Such lignosulfonate compounds are generally produced as a by-product of the wood pulping industry by either the sulfite or kraft process. Such sulfonated lignin products provide three basic functions in dyestuff compositions:

(1) They assist in reducing the dye particles to a fine size;
(2) They maintain a dispersing medium for the dyestuff; and
(3) They are used as a diluent.

The advantages of employing sulfonated lignins as dispersants in dyestuff compositions are based on their unique physical properties which include good compatibility with many dye systems, outstanding dispersant characteristics at ambient and elevated temperatures, and availability. There are certain disadvantages in employing lignins, whether they are sulfite lignins or sulfonated kraft lignins, as dispersants. Negative factors in the use of such lignins as dyestuff additives relate to problems of high inorganic salt content, i.e., electrolyte content, when lowered in pH, foaming, high pH, fiber staining, poor heat stability, and high viscosity. These adverse properties are troublesome to dyers and many attempts have been made to overcome these and other disadvantages.

Inorganic electrolyte content of lignin dispersants and dyestuff additives greatly effect their use in a specific dyestuff additive formulation. High electrolyte content of a lignin dispersant imposes unwanted side effects on hydrophobic dyestuffs. In vat dyes, high salt content of the lignin additives can cause harmful rheological effects during storage of the dyes. The viscosity of the oxidized form in the presence of salts generally increases to a level where the dye mixture can only be removed from a storage container with considerable difficulty. Recent use in this country of double strength dyes over powder dyes has necessitated a reduced application level of the lignin dispersants in order to accomodate the increased amount of dye, thus dictating that the dispersant be in its purest state possible.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. The following U.S. patents are directed to reacting and modifying lignins to make them more suitable as dye dispersants: U.S. Pat. Nos. 4,001,202 to P. Dilling et al., 4,184,845 to S. Y. Lin; 4,131,564 to P. Dilling; 3,156,520 to L. A. Baisdell; 3,094,515 to K. F. Keirstead et al; 3,726,850 to Detroit; 2,680,113 to E. Adler et al; 3,769,272 to Hintz; 3,841,887 to Falkehag et al; 4,131,564 to P. Dilling; 4,355,996 to P. Dilling et al; and 4,308,203 to Lin.

U.S. Pat. Nos. 2,525,433; 2,690,973; and 3,503,762 disclose the use of lignins as an additive in printing inks, pastes, and gels. The foregoing patent art is cited to show the state of the art and is not intended to be all inclusive of lignin modifications for use as dye additives.

More recently in my copending commonly assigned U.S. patent applications Ser. No. 601,047, now U.S. Pat. No. 4,521,336 and Ser. No. 601,049, now U.S. Pat. No. 4,551,151, both filed Apr. 16, 1984, there is described a process for preparing sulfonated lignins particularly suited for use as dyestuff dispersants, and the products produced thereby, wherein the viscosity of sulfonated lignins can be reduced with improvement in heat stability properties by removing the low molecular weight component of the lignin and thereafter sulfonating the remaining lignin material with sodium sulfite ($Na_2SO_3$) and aldehyde at a pH of about 8.0 to 9.2. Also, in my commonly assigned copending U.S. patent application Ser. No. 532,677, filed Sept. 16, 1983 and now abandoned, there is disclosed a process for producing sulfonated lignins for use as dye dispersants and additives, and the products produced thereby, wherein dispersability and heat stability of the lignins are improved by post-sulfonation cross-linking of the sulfonated lignins at controlled lower pH levels, typically a pH of between about 7.0 to 8.5.

In the paper industry, lignin is obtained as a by-product from spent pulping liquors, known as black liquor, where lignocellulosic materials, such as wood, straw, cornstalks, bagasse and the like are processed to separate the cellulosic pulp from the lignin. The lignins employed in the process of this invention may readily be obtained from the kraft wood pulping process wherein the natural lignin is present as a sodium salt. In kraft pulping, the wood is subjected to the effects of strong alkali. The lignin forms a soluble sodium salt in the alkaline region which is separated from the cellulose and dissolves in the pulping liquor. The lignin is then recovered from the black liquor by acidification.

Acidification of black liquor containing the lignin salt generally may be accomplished by the introduction of carbon dioxide which converts the phenolic hydroxide groups on the lignin molecule, which are in ionized form, into their free phenolic or acidic form. This conversion renders the lignin insoluble in the black liquor and, as a result, it precipitates out. To precipitate the alkali lignins from the black liquor as water-insoluble products, black liquor initially having a pH of around 13.0 is acidified to about a pH of 10.5 at which point the lignin begins to precipitate. The lignin precipitate can be further purified by reducing the pH level to pH 2, where the lignin is coagulated and washed with water to obtain a lignin product identified as "A" lignin.

Lignin obtained from the kraft, soda or other alkaline processes is not recovered as a sulfonated product, but is sulfonated by reacting the material with a bisulfite or sulfite compound. A sulfonated lignin is understood to be any lignin containing at least an effective amount of sulfonate groups to give water solubility in moderately acid and higher pH solutions.

One of the conventional processes for sulfonating lignin involves sulfomethylation of the alkali lignin by reacting the lignin with sodium sulfite and formaldehyde. Such a process is described in Adler et al U.S.

Pat. No. 2,680,113. Sulfomethylation acts upon the aromatic phenolic nuclei of the lignin molecule in such a manner that—CH$_2$SO$_3$H groups are bonded to the aromatic phenolic ring. It is also possible to sulfonate the lignin side-chain of the aromatic nucleus by sodium sulfite treatment of the lignin in the absence of formaldehyde. Sulfomethylation of the alkali lignin has been carried out generally at a pH level of 9.0 or higher, in order to ensure optimum phenol ionization and solubility of the lignin for sulfomethylation.

Although prior art sodium salts of sulfomethylated lignins existed as relatively pure products when sold as a high alkaline pH composition, their use as a dyestuff additive requires adjustment by a formulator and/or a dyer to an acidic pH level commonly employed in most textile dyeing by the addition of acid. Since the amount of acid required to either neutralize or acidify the lignin corresponds directly to the amount of electrolytes which develop in a given dyestuff formulation, acidification produces increased undesirable electrolyte content in the composition. In lowering the pH of the lignosulfonates, the phenolic groups which convert from ionized form to acid form initially produce a buffering effect in the higher alkaline region, such that their initial response to acidification is minimal. This results in large amounts of acid being necessary to initially lower the formulation pH when the starting pH of the lignin compositions is in the higher alkaline range, resulting in the creation of corresponding higher amounts of electrolytes.

Acidification of the lignin by the formulator and/or dyer not only produces undesirable salts in the dyestuff composition, but also is an added expense in preparation of the lignin additive for use.

Although ammonium lignosulfonate salts have been produced as a by-product of the ammonia-based sulfite pulping process, and ammonium naphthalene sulfonates have been produced in the oil refining field, ammonium salts of sulfomethylated lignins have not heretofore been produced effectively as a commercially viable by-product from the black liquor of the kraft pulping process. Such is due to the fact that when an aldehyde, such as formaldehyde (CH$_2$O), and ammonium sulfite [(NH$_4$)$_2$SO$_3$] are added under alkaline conditions to sulfomethylate the lignin, multiple reactions occur. In addition to forming a desired soluble ammonium salt of the sulfomethylated lignin, ammonium hydroxide acts to combine with the formaldehyde and the lignin to produce a large amount of undesirable insoluble monomeric, dimeric and trimeric lignin products.

These reaction products are illustrated by the following imperical formulae:

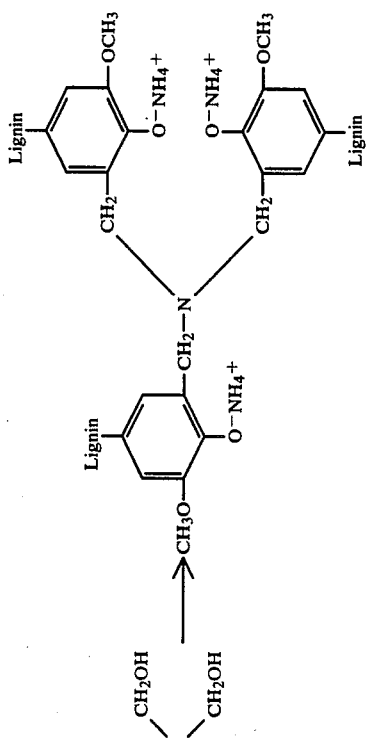
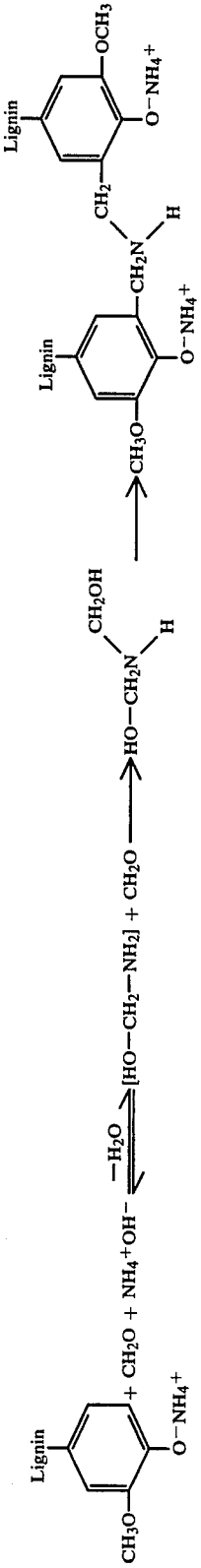
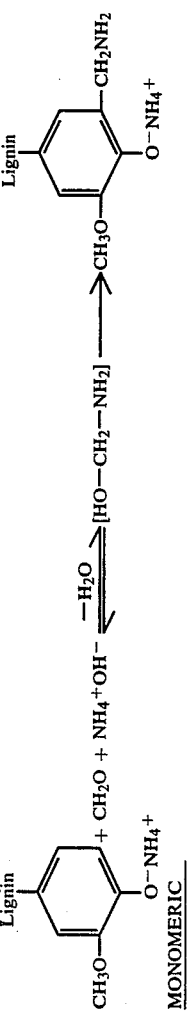

Attempts to produce the soluble ammonium salt of sulfomethylated lignins, as described above, results in appreciable loss of the reaction materials in the form of insoluble polymeric lignin compounds.

Recent efforts have been directed in the energy field to the use of coal-water slurries as a fluid fuel to replace more costly oil and gas fuels commonly employed in power plant and boiler operations. Such coal-water slurries are made by grinding mine coal into a powder-like dust which is mixed with water and chemical additives to simulate fluid flow characteristics of conventional gas and oil fuels. The chemical additives in the coal-water slurries improve fluid flow characteristics and assist, as a dispersant, to maintain the coal particles in suspension in the slurries.

It has been proposed to use lignosulfonate salts as dispersants in coal-water slurries. U.S. Pat. No. 4,465,495 discloses the use of certain of such organosulfonate salts in coal-water slurries. However, the sodium salts of lignosulfonates have been found to produce scaling and corrosion of fuel burners and boilers. Ammonium salts of sulfomethylated lignin by-products of the kraft paper-making process have not been produced with sufficient economy to justify their use, due to the aforementioned creation of an undesired insoluble lignin portion.

BRIEF OBJECTS OF THE PRESENT INVENTION

It is an object of the present invention to provide an improved method for manufacturing ammonium salts of lignosulfonates which overcomes problems of the prior art.

It is a further object to provide an improved method for producing ammonium salts of lignosulfonates particularly suited for use as dyestuff and coal-water slurry additives and dispersants.

It is a more specific object to provide as improved method of producing low impurity and low electrolyte-containing ammonium lignosulfonate salts as a by-product of a kraft pulping process.

It is still another object to provide improved low electrolyte-containing ammonium salts of lignosulfonates for use as dye composition and coal-water slurry additives.

SUMMARY OF THE INVENTION

The present invention is directed to a method of producing ammonium salts of lignosulfonate as by-products from the kraft wood pulping process. The lignin compounds are particularly suited for use as dispersants in dyestuff compositions and in coal-water slurries. In the method, the phenol component of the lignin material recovered from the black liquor is ionized and methylolation of the lignin can occur in an alkaline liquid medium; the pH of the liquid medium is lowered to an acid range to precipitate the methylolated lignin therefrom; the methylolated lignin is washed to remove inorganic salts, excess aldehyde and impurities from the lignin; and the lignin is thereafter sulfonated with an ammonium salt of a sulfur-oxygen containing compound in a liquid medium at any desired pH level. The resultant lignin product, if sulfonated at a neutral or acidic pH, may be employed directly as a dyestuff additive without the need for large amounts of acid to acidify the same, thus avoiding the formation of additional inorganic salts and increasing the electrolyte content of the lignin, as in the prior art.

More specifically, in the present method, the phenol component of the lignin in liquid medium may be ionized, permitting methylolation of the lignin at a pH of between about 9.5 to 12.5, preferably at pH 11.0, by treatment with an aldehyde, such as formaldehyde. The pH of the methylolated lignin is then lowered to a pH range of about 1.0 to 3.0 to precipitate the lignin. The precipitated lignin is washed to remove the inorganic salts and unreacted formaldehyde therefrom. The methylolated, purified lignin composition thereafter is sulfonated with an ammonium sulfite or bisulfite compound at any desired pH range without formation of the undesired insoluble monomeric, dimeric and trimeric reaction products, as in the prior art. Residues of such insoluble non-sulfomethylated lignin compounds present in the kraft lignin by-products produced in accordance with the present invention have been found to be consistently less than 0.1% by weight, based on the dry lignin by-product weight. Preferably the sulfonation is carried out at a pH of below about 7.0 if the lignin composition is to be employed as a dispersant in a dye composition.

Low sulfonated lignin products of the present invention, i.e., ammonium salts of sulfomethylated lignins have a degree of sulfonation of about 1 mole or less per 1,000 grams of lignin, may be produced to exhibit a free inorganic salt content, i.e., electrolyte content, of as low as between about 0.5 to 3.0%, based on the weight of solids in the lignin composition. Lignin products of the present invention which have a higher degree of sulfonation, i.e., a sulfonation of greater than about 1.6 moles per 1,000 grams of lignin, have been produced to exhibit a free inorganic salt content, i.e., electrolyte content, at pH of about 7.0 of between about 5.0 to 13.0%, based on the weight of solids in the lignin composition.

In distinction thereto, certain known prior art high and low sulfonated sodium salts of lignin products, i.e., REAX 83 and REAX 85 (products of Westvaco Corporation) have been found to exhibit a 19 to 22% and a 14 to 17% free inorganic salt content, respectively, at a pH of about 7.0.

DETAILED DESCRIPTION OF PREFERRED EMBODIMENTS

The method of the present invention involves a five step procedure of (1) ionizing the phenol component of the lignin at an alkaline pH, (2) methylolating the ionized lignin by the addition of an aldehyde, (3) lowering the lignin pH to an acid pH to precipitate the methylolated lignin, (4) washing the precipitate to remove undesired inorganic salts, unreacted aldehyde and any other residual reactants therefrom, and (5) thereafter sulfonating the methylolated lignin by the addition of an ammonium salt of a sulfur and oxygen-containing compound, e.g., ammonium sulfite or bisulfite, at any desired pH range. If the methylolated lignin is sulfonated in an acid pH range, it may be used directly by a dyer with little or no adjustment by acid or base to prepare it for the dyestuff composition.

Sulfomethylation of a lignin requires ionization of the aromatic phenolic ring for the reaction to occur. The ionization of the phenolic component occurs when the lignin is subjected to an alkaline pH. Although the phenol component starts to ionize at a pH of approximately 7.0, it is generally the practice to raise the pH of the lignin to approximately 9.5 to 12.5 for optimum ionization. Heretofore, the lignin has been sulfomethylated by the addition of both sodium sulfite and formaldehyde, resulting in a lignin product having a pH of approximately 9.0 to 12.5 or higher. Such products then have to be acidified for subsequent use by the formulator and/or dyer in a dyestuff composition, with consequent electrolyte build-up.

The new method of the present invention permits the production of an ammonium salt of a sulfomethylated lignin at any desired final pH range without formation of the undesirable insoluble products mentioned. This is because the ionized phenolic ring is only methylolated in the alkaline region, after which the methylolated lignin is converted to an acidic form to precipitate and wash the lignin to remove inorganic salts and unreacted aldehyde therefrom. Sulfonation of the methylolated lignin can then be accomplished at any desired pH level without the undesired side reactions and inorganic salt formation. For dyestuff end uses, the pH of the prepared sulfomethylated lignin can be readily available in an acidic pH range if desired by the dyer.

Thus, the present invention provides improved ammonium salts of sulfomethylated lignins which have advantages over existing lignin dispersants. The product can be produced as a kraft process by-product without the formation of undesired insoluble side reaction products. A product pH of 7.0 or below can be achieved without large amounts of the inorganic salt and electrolyte interference as experienced with alkaline product pH of existing dispersants and additives. A lower conductance and enhancement of lignin purity is achieved due to the marked reduction of side reaction materials and inorganic matter as a result of improved lignin isolation and sulfonation. There is considerably lower acid requirements for pH adjustments of the products to dyeing conditions. Lower lignin color and consequent reduced fiber staining is achieved as a result of lowering the sulfonation pH to a more desireable pH value. Improved heat stability of the product is achieved in use with dyes which are electrolyte sensitive.

The present inventive method reaction may be expressed as follows:

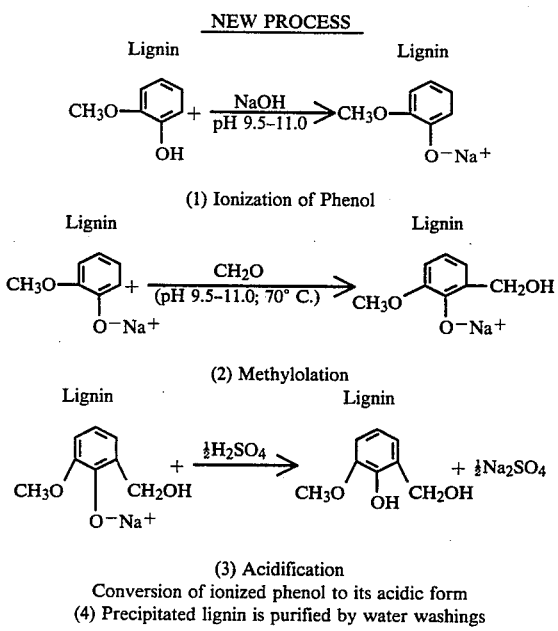

NEW PROCESS (1) Ionization of Phenol (2) Methylolation (3) Acidification
Conversion of ionized phenol to its acidic form
(4) Precipitated lignin is purified by water washings

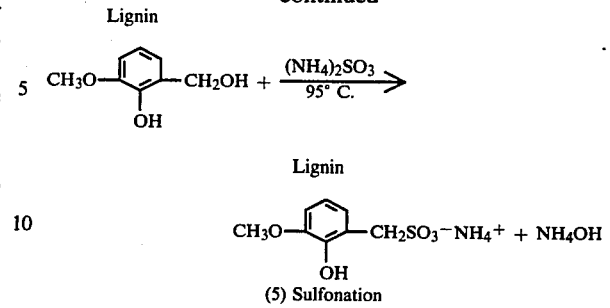

(5) Sulfonation

As can be seen from the foregoing chemical formulae, to avoid the undesired side reactions and reduce the electrolyte content of the resultant lignin composition, the lignin is acidified after methylolation to convert the phenolic group from its ionized to its acid form. After washing to remove inorganic salts, formaldehyde, and residual reactants, the methylolated lignin is preferably acidified to a pH of around 5.0, although any pH between 1.0 and 7.0 would be sufficient for maintaining a final resultant pH of the dispersant at or below a neutral pH level. For dyestuff end uses, ammonium bisulfite ($NH_4HSO_3$) preferably may be used for sulfonation at a pH of around 6.3 instead of ammonium sulfite [$(NH_4)_2SO_3$]. A small change in pH from pH 6.3 to pH 6.8 during the reaction is attributed to the small amount of ammonium sulfite present at a starting pH of around 6.3. If the lignin product is to be used as an additive in a coal-water slurry, alkaline pH products generally are desired. Thus the sulfonation reaction may be carried out in the alkaline range.

The following laboratory procedure illustrates one method of preparing the sulfomethylated lignin products of the present invention. Although the methylolation step employs three moles of formaldehyde, and three moles of ammonium sulfite are employed for the sulfonation step (based on 1,000 grams of lignin), other molar ratios of these components can be employed with satisfactory results. For example, if it is desired to have a lower sulfonation level, the amounts of the aldehyde and the ammonium sulfur-oxygen containing compounds could be reduced accordingly. The sulfonation step may be carried out at acid, neutral, or basic pH levels, as may be desired in the final product.

LABORATORY PROCEDURE

A. Methylolation (1) A known amount of solid lignin recovered from the black liquor of a pulping process in "A" lignin form is slurried to a 25% total solids content.

(2) The pH of the slurry is adjusted to 11.0 with 50% sodium hydroxide (NaOH) solution.

(3) The temperature of the slurry is raised to 65° to 70° C.

(4) Three moles of formaldehyde (HCHO) are added and the slurry reacted for two hours at 65° to 70° C.

(5) The resulting slurry is acidified to a pH of 5.0 with 25% sulfuric acid solution ($H_2SO_4$).

(6) The precipitated lignin is heat coagulated to 85° C.

(7) The coagulated lignin is cooled to room temperature and the slurry filtered through a Buchner funnel.

(8) The collected solid lignin is washed with a volume of tap water equivalent to the solids present therein (100 g. lignin to 100 ml. $H_2O$).

(9) The lignin solids content is determined, and a known amount of methylolated lignin slurry is adjusted to 25% solids.

B. Sulfonation (1) Three moles of ammonium sulfite [$(NH_4)_2SO_3$] are added to the methylolated lignin.

(2) The pH of the slurry is adjusted with ammonium hydroxide ($NH_4OH$) to around 7.2 to 7.5, if necessary.

(3) The temperature of the slurry is raised to 95° to 100° C. and is maintained for about 16 hours. Final pH should be approximately 8.4.

(4) The product is cooled and dried.

The sulfonation reaction can be conducted at atmospheric pressure at a temperature of around 80°–100° C., preferably at about 95° C., or at elevated pressures above 100° C., up to about 190° C., preferably at about 120°–140° C. Atmospheric pressure conditions are preferred since pressure-reaction above 100° C. tends to cause a color increase in the lignin product, the higher the temperature the darker the lignin color. This degradation or darkening in color reflects itself in higher fiber staining characteristics during the dyeing cycle to produce duller color shades.

Inorganic electrolyte contents of ammonium salts of sulfomethylated lignin products produced in accordance with the foregoing laboratory procedure are determined by adding 10 grams of the lignin product to 1,000 ml. of water. The pH is adjusted to 7.0 and the solution added to an Amicon Laboratory Ultra-Filtration System, Model M 2000 which contained a 500 molecular size membrane. The membrane allows molecular weights below 500, e.g., inorganic salts, to go through it while the lignin constituents are retained by the membrane. Nitrogen is used under pressure as a carrier gas. After the volume inside the ultra-filtration apparatus decreases to 100 ml., deionized water is added to 1,000 ml. This sequence is repeated until the conductance of eluent corresponds with the conductance of the water. The concentrate inside the ustra-filtration chamber is then removed, the water evaporated, and the residue dried. The difference in the weight amount of the residue and the 10 grams of lignin product orignally employed corresponds to the inorganic salt content and thus the amount of electrolyte by weight present in the sample.

A typical high sulfonated ammonium salt lignin product tested for inorganic electrolyte and salt content was found to have 5.2% by weight inorganic salt, or electrolyte, based on the weight of lignin solids, while a typical low sulfonated ammonium salt lignin product was found to have 0.78% by weight based on the weight of lignin solids.

That which is claimed is:

1. A method of producing ammonium salts of lignosulfonates particularly suited for use as additives in dyestuff compositions and coal-water slurries comprising the steps of:
   (a) ionizing a phenol component of a kraft lignin material in an alkaline liquid medium,
   (b) methylolating the lignin material in the ortho position of the phenol component,
   (c) lowering the pH of the liquid medium to an acid pH to precipitate the methylolated lignin material,
   (d) washing the precipitated lignin material with water to remove inorganic salts and residual reactants therefrom, and
   (e) sulfonating the washed, purified methylolated lignin material with an ammonium salt of a sulphur-oxygen containing compound in a liquid medium.

2. A method as defined in claim 1 wherein the lignin material is sulfonated while maintaining the pH of the liquid medium at about 7.0 or below.

3. A method as defined in claim 2 wherein the methylolated lignin material is sulfonated at a pH of about 6.3.

4. A method as defined in claim 2 wherein the lignin material is methylolated at a pH level of between about 9.5 to 12.5.

5. A method as defined in claim 3 wherein the methylolation pH is about 11.0.

6. A method as defined in claim 5 wherein the lignin material is sulfonated by reaction with an ammonium sulfite or bisulfite compound.

7. A method of preparing sulfonated lignins particularly suited for use as additives in dyestuff compositions and coal-water slurries comprising the steps of:
   (a) isolating a lignin material from black liquor of a kraft paper-making process,
   (b) dispersing the material in an alkaline liquid medium to ionize the phenolic component of the lignin material,
   (c) treating the ionized lignin material with a formaldehyde to methylolate the same,
   (d) reducing the pH of the liquid medium to an acidic level to precipitate the methylolated lignin,
   (e) washing the precipitated methylolated lignin with water to remove inorganic salts and residual reactants therefrom, and
   (f) treating the methylolated lignin with an ammonium salt of a sulfonating compound in a liquid medium under conditions to produce an ammonium salt of a sulfomethylated lignin product having low inorganic electrolyte content.

8. A method as defined in claim 7 wherein the sulfomethylated lignin products produced thereby have a non-sulfomethylated lignin residue of less than about 0.1% by weight, based on the dry weight of the sulfomethylated lignin.

* * * * *